(12) United States Patent
Zou et al.

(10) Patent No.: US 8,755,139 B1
(45) Date of Patent: *Jun. 17, 2014

(54) SYSTEM WITH SERVO CLOCK AND WRITE CLOCK BASED PHASE ESTIMATION FOR DISCONTINUOUS MEDIA WRITING

(71) Applicant: Marvell International Ltd., Hamilton (BM)

(72) Inventors: Qiyue Zou, San Jose, CA (US); Xueshi Yang, Cupertino, CA (US); Gregory Burd, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/708,497

(22) Filed: Dec. 7, 2012

Related U.S. Application Data

(63) Continuation of application No. 12/888,744, filed on Nov. 10, 2011, now Pat. No. 8,331,050.

(60) Provisional application No. 61/245,976, filed on Sep. 25, 2009.

(51) Int. Cl.
*G11B 5/09* (2006.01)
(52) U.S. Cl.
USPC .......................................................... 360/51

(58) Field of Classification Search
None
See application file for complete search history.

(56) References Cited

U.S. PATENT DOCUMENTS

| 2006/0132953 A1 | 6/2006 | Asakura et al. |
| 2009/0237829 A1 | 9/2009 | Ozawa et al. |
| 2010/0053814 A1 | 3/2010 | Shibano |
| 2010/0073801 A1 | 3/2010 | Itakura |
| 2010/0118426 A1 | 5/2010 | Vikramaditya et al. |
| 2010/0123973 A1 | 5/2010 | Ozawa et al. |
| 2010/0142078 A1 | 6/2010 | Annampedu et al. |
| 2010/0220409 A1 | 9/2010 | Shibano |

*Primary Examiner* — Regina N Holder

(57) ABSTRACT

A system including a storage device, a channel module, a sampling module, a first phase module, and an adjustment module. The storage device includes servo sectors, and discontinuous media with bit islands. The channel module reads the servo sectors based on a servo clock to generate an analog signal. The sampling module samples the analog signal based on a servo clock signal to generate first samples, and based on a write clock signal to generate second samples. The first phase module estimates a phase of the write clock signal based on the first samples, and the second samples. The adjustment module adjusts the phase of the write clock signal based on the estimated phase of the write clock signal. The channel module, based on the write clock signal with the adjusted phase, writes data to the bit islands of the discontinuous media.

20 Claims, 9 Drawing Sheets

SYSTEM WITH SERVO CLOCK AND WRITE CLOCK BASED PHASE ESTIMATION FOR DISCONTINUOUS MEDIA WRITING

CROSS-REFERENCE TO RELATED APPLICATIONS

This application is a continuation of U.S. Pat. No. 12/888,744, filed Sep. 23, 2010, (now U.S. Pat. No. 8,331,050) which claims the benefit of U.S. Provisional Application No. 61/245,976, filed on Sep. 25, 2009. The disclosures of the above applications are incorporated herein by references in their entirety.

FIELD

The present disclosure relates to magnetic recording systems for continuous media and bit-patterned media.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Continuous media recording systems write data to a disk in a continuous pattern. Prior to a write operation, servo sector information (e.g., preamble data, synchronization marks, and positioning information) is read from a disk. The servo sector information is used to position a read/write head and to correct bit positioning error. Bit positioning error refers to a difference between (i) the true bit position on a disk that data is stored (or is to be stored) and (ii) the read/write head position. Subsequent to correcting bit positioning error, data is written to sectors of the disk at a desired position. Since data is written to the disk in a continuous pattern, the data may be written generally at any point within a sector of the disk.

Bit-patterned media (BPM) recording systems provide increased storage capacity over continuous media recording systems. BPM recording systems may store as much as ten times more information on a magnetic storage device (e.g. a magnetic disk or hard disk) than continuous media recording systems. As an example, a BPM recording system may store 1 or more terabits (Tbit) of data in one square inch (in$^2$) of a magnetic storage device.

BPM recording systems write data to a disk in discontinuous island-based patterns. Bits of data are stored at specific points or discrete bit islands on the disk. For example, each bit island may store 1 bit of data. Bit positioning accuracy requirements of bit-patterned media recording systems are more stringent than that of continuous media recording systems. This assures that data is written over bit island areas of the disk while minimizing and/or avoiding attempts to write data over areas between bit islands.

A BPM recording system may include a servo clock and a write clock. The servo clock may be used for timing read events of servo sector information from the disk. The write clock may be used for timing write events including positioning and access timing of a write head. Synchronization of the write clock with the patterned media is needed in a BPM recording system due to the discontinuous format of BPM. A write clock signal is synchronized when rising and/or falling edges of the write clock signal are aligned with start and end positions of the bit islands, such that writing occurs over the bit islands and not over areas between bit islands.

SUMMARY

A system is provided and includes a storage device, a channel module, a sampling module, a first phase module, and an adjustment module. The storage device includes servo sectors, and discontinuous media with bit islands. The channel module is configured to read the servo sectors based on a servo clock to generate an analog signal. The sampling module is configured to sample the analog signal (i) based on a servo clock signal to generate first samples, and (ii) based on a write clock signal to generate second samples. The first phase module is configured to estimate a phase of the write clock signal based on (i) the first samples, and (ii) the second samples. The adjustment module is configured to adjust the phase of the write clock signal based on the estimated phase of the write clock signal. The channel module is configured to, based on the write clock signal with the adjusted phase, write data to the bit islands of the discontinuous media.

In other features, a method is provided and includes reading the servo sectors of a storage device based on a servo clock to generate an analog signal. The storage device includes discontinuous media with bit islands. The analog signal is sampled (i) based on a servo clock signal to generate first samples, and (ii) based on a write clock signal to generate second samples. A phase of the write clock signal is estimated based on (i) the first samples, and (ii) the second samples. The phase of the write clock signal is adjusted based on the estimated phase of the write clock signal. Data is written to the bit islands of the discontinuous media based on the write clock signal with the adjusted phase.

In other features, a write clock synchronization system is includes a channel module configured to read a servo section of a bit-patterned magnetic medium to determine a preamble signal based on the servo section. An initial phase estimating system is configured to estimate an initial phase of the preamble signal based on servo clock samples of the preamble signal and estimate an initial phase of the preamble signal based on write clock samples of the preamble signal. A phase determination module is configured to estimate a phase of the write clock signal based on the initial phase of the preamble signal estimated using the servo clock samples and the initial phase of the preamble signal estimated using the write clock samples. A phase error module is configured to estimate a phase error based on the phase of the write clock signal. The channel module is configured to write data to discontinuous bit islands of the bit-patterned magnetic medium based on the phase error.

In other features, a phase adjustment module is configured to adjust the phase of the write clock signal to generate a phase adjusted clock signal. The channel module is configured to write data to the discontinuous bit islands based on the phase adjusted clock signal.

In other features, the initial phase estimating system includes an analog-to-digital converter configured to sample the preamble signal and generate a sampled preamble signal based on one of a servo clock signal and the write clock signal. An initial phase estimating module is configured to estimate one of the initial phase of the preamble signal estimated using the servo clock samples and the initial phase of the preamble signal estimated using the write clock samples based on the sampled preamble signal.

A clock control module is configured to control a multiplexer to select the servo clock signal during a first portion of the preamble signal and the write clock signal during a second portion of the preamble signal. The analog-to-digital converter is configured to sample the first portion of the preamble signal based on the servo clock signal and the second portion of the preamble based on the write clock signal.

In other features, the initial phase estimating system includes an initial phase estimating module. The initial phase estimating module is configured to estimate periods of the servo clock signal and the write clock signal. The initial phase estimating module is configured to estimate the initial phase of the preamble signal estimated using the servo clock samples and the initial phase of the preamble signal estimated using the write clock samples based on samples of the preamble signal, frequency of the preamble signal, and the periods of the servo clock signal and the write clock signal.

In other features, the phase determination module determines the phase of the write clock signal based on a difference between the initial phase of the preamble signal estimated using the servo clock samples and the initial phase of the preamble signal estimated using the write clock samples. In other features, the phase error module is configured to determine the phase error based on at least one of a synchronization mark time or a start time of a first bit island written subsequent to the sync mark time.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

Figure 1:
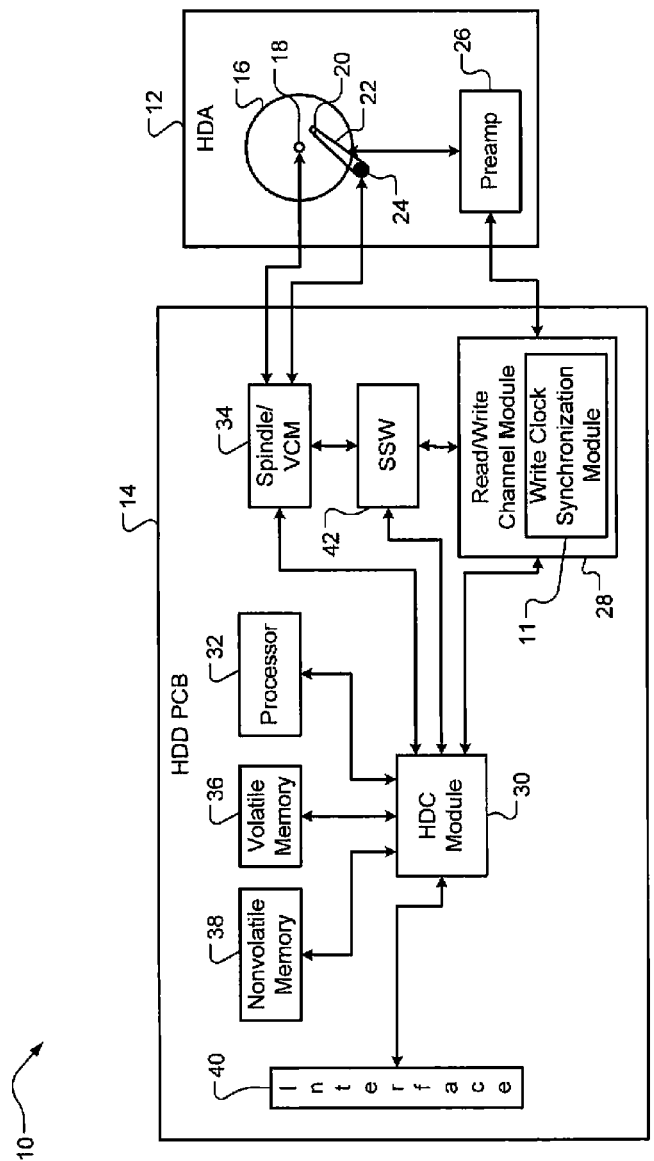
FIG. 1 is a functional block diagram of a hard disk drive system incorporating a write clock synchronization system in accordance with the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

In a continuous media recording system, bit positioning error is corrected prior to writing to a disk. A continuous media recording system may include a servo clock and a write clock. The servo clock is used for timing read events of servo sector information. The write clock is used for timing write events including positioning and access timing of write head. Positioning of bits on the disk is defined by the positioning of the write head during the write process. Correction of bit positioning error may include adjusting frequencies of the servo and write clocks. A first order or second order phase lock loop (PLL) may be used to control and correct the frequency of the servo clock. The frequency of the write clock may be adjusted using open loop control by mirroring the corrections to the servo clock. The mirrored corrections may include frequency and phase adjustments.

The frequency and phase of the write clock may deviate from desired values due to the open loop control of a continuous media recording system. Although this deviation may not negatively affect performance of a continuous media recording system (as data is written in a continuous pattern), the deviation can negatively affect performance of a bit-patterned media (BPM) recording system significantly.

A BPM recording system may also include a servo clock and a write clock. Bit positioning may be performed based on the servo clock and the write clock. Timing requirements of bit positioning are more stringent in BPM recording systems than continuous media recording systems due to the discontinuous island-based patterns (or separations between bit islands). Deviation in frequency and phase of a write clock can cause misalignment between a write clock and bit islands. A write clock signal is aligned with bit islands when rising and/or falling edges of the write clock signal are synchronized with starting edge and ending edge positions of the bit islands.

A read/write head is synchronized with bit islands when the read/write head: is positioned over a starting edge of a bit island; and begins writing at the starting edge when a rising edge of a write clock signal occurs. Write clock synchronization and/or write head synchronization with bit islands prevents writing attempts over areas between bit islands. The areas between the bit islands may be non-magnetic areas or grooves (i.e. the bit islands may be separated by non-magnetic materials).

In a BPM recording system, write clock/bit island misalignment and/or loss in write clock synchronization can lead to writing errors. The writing errors can be difficult to detect and/or correct. In the following description, implementations are disclosed that precisely align write clock pulses with bit islands. This alignment provides write clock and write head synchronization with bit islands.

In FIG. 1, a hard disk drive (HDD) system 10 incorporating a write clock synchronization system 11 is shown. The HDD system 10 includes a hard disk assembly (HDA) 12 and a HDD printed circuit board (PCB) 14. The HDA 12 includes one or more circular platters (i.e. disks) 16, which have magnetic surfaces that are used to store data magnetically. Data can be stored in either a continuous media format or bit-patterned format on the disks 16. The disks 16 are arranged in a stack, and the stack is rotated by a spindle motor 18. At least one read and write head (hereinafter, "head") 20 reads data from and writes data on the magnetic surfaces of the disks 16.

The head 20 includes a write element, such as an inductor, that generates a magnetic field and a read element, such as a magneto-resistive (MR) element, that senses the magnetic field on the disks 16. The head 20 is mounted at a distal end of an actuator arm 22. An actuator, such as a voice coil motor (VCM) 24, moves the actuator arm 22 relative to the disks 16.

The HDA 12 includes a preamplifier device 26 that amplifies signals received from and sent to the head 20. The preamplifier device 26 generates a write current that flows through the write element of the head 20 when writing data. The write current is used to produce a magnetic field on the magnetic surfaces of the disks 16. Magnetic surfaces of the disks 16 induce low-level analog signals in the read element of the head 20 during reading of the disks 16. The preamplifier device 26 amplifies the low-level analog signals and outputs amplified analog signals to a read/write channel module 28.

The HDD PCB 14 includes the read/write channel module 28, a hard disk controller (HDC) 30, a processor 32, a spindle/VCM driver module 34, volatile memory 36, nonvolatile memory 38, and an input/output (I/O) interface 40. The read/write channel module 28 includes the write clock synchronization module 11.

The write clock synchronization system 11 (i) synchronizes write clock signals with synchronization marks in servo sector regions of the disks 16 and/or (ii) synchronizes write clock signals with discontinuous bit islands on the disks 16. The write clock synchronization system 11 estimates phases of servo clock signals and write clock signals at certain times. Based on the estimates, the write clock signals are close-loop controlled and aligned with bit islands.

During write operations, the read/write channel module 28 may encode the data to increase reliability by using error-correcting codes (ECC) such as run length limited (RLL) code, Reed-Solomon code, etc. The read/write channel module 28 then transmits the encoded data to the preamplifier device 26. During read operations, the read/write channel module 28 receives analog signals from the preamplifier device 26. The read/write channel module 28 converts the analog signals into digital signals, which are decoded to recover the original data.

The HDC module 30 controls operation of the HDD system 10. For example, the HDC module 30 generates commands that control the speed of the spindle motor 18 and the movement of the actuator arm 22. The spindle/VCM driver module 34 implements the commands and generates control signals that control the speed of the spindle motor 18 and the positioning of the actuator arm 22. Additionally, the HDC module 30 communicates with an external device (not shown), such as a host adapter within a host device, via the I/O interface 40. The HDC module 30 may receive data to be stored from the external device, and may transmit retrieved data to the external device.

The processor 32 processes data, including encoding, decoding, filtering, and/or formatting. Additionally, the processor 32 processes servo or positioning information to position the head 20 over the disks 16 during read/write operations. Servo, which is stored on the disks 16, ensures that data is written to and read from correct locations on the disks 16. In some implementations, a self-servo write (SSW) module 42 may write servo on the disks 16 using the head 20 prior to storing data on the HDD 10.

Figure 2:
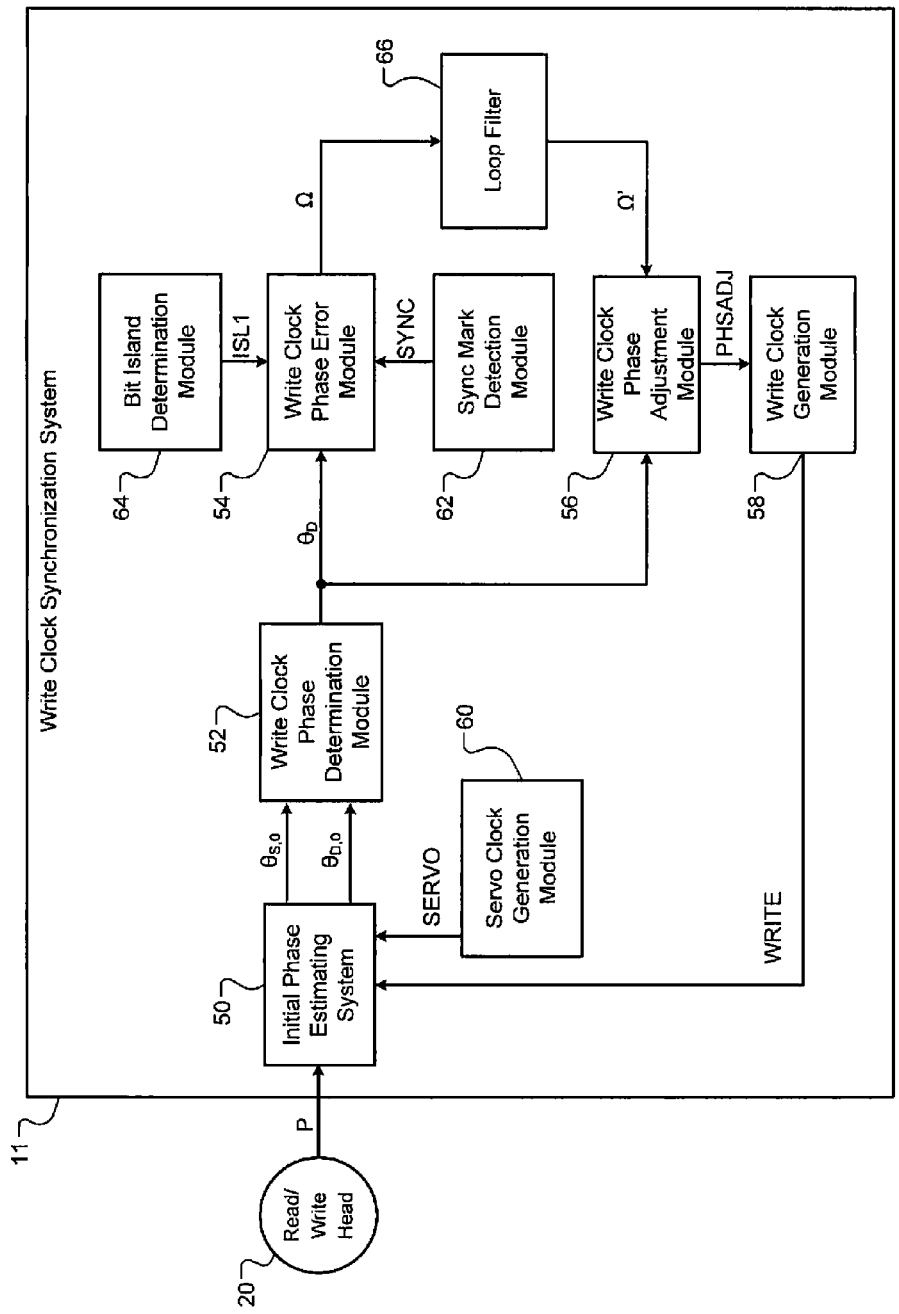
FIG. 2 is a functional block diagram of the write clock synchronization system in accordance with the present disclosure.

In FIG. 2, the write clock synchronization system 11 is shown. The write clock synchronization system 11 includes an initial phase estimating system 50, a write clock phase determination module 52, a write clock phase error module 54, a write clock phase adjustment module 56, and a write clock generation module 58. The initial phase estimating system 50 and modules 52-58 may by connected in a feedback arrangement and/or form a phase locked loop, as shown. The initial phase estimating system 50 estimates an initial servo clock phase $\theta_{S,0}$ of a servo clock signal SERVO and initial write clock phase $\theta^{D,0}$ of a write clock signal WRITE. The servo clock signal SERVO may be generated by a servo clock generation module 60. The write clock signal WRITE may be generated by the write clock generation module 58. The initial phases $\theta_{S,0}$, $\theta_{D,0}$ are defined below with respect to the implementation of FIG. 5.

The write clock phase determination module 52 determines write clock phase $\theta_D$ of the write clock signal WRITE base on the initial phases $\theta_{S,0}$, $\theta_{D,0}$. The initial phases $\theta_{S,0}$, $\theta_{D,0}$ may be received from the initial phase estimating system 50, as shown.

The write clock phase error module 54 determines phase error $\Omega$ of the write clock phase $\theta_D$. Phase error $\Omega$ is defined below with respect to the implementation of FIG. 6. The phase error $\Omega$ may be determined based on the write clock phase $\theta_D$, a synchronization signal SYNC and/or a bit island signal ISL1. The synchronization signal SYNC indicates when a synchronization (sync) mark is detected. The sync mark may be a predetermined sequence of code with a predetermined pattern that is recognized and detected by, for example, a sync mark detection module 62. The sync mark may be detected during reading of servo information from a disk. The servo information may be read from a servo wedge (or section) in a track of the disk and include a preamble, a sync mark, and position adjusting information. The bit island signal ISL1 may indicate a starting edge of a first bit island on which data is to be written subsequent to detection of the sync mark.

The phase error $\Omega$ may be filtered by a loop filter 66 to generate a filtered phase error $\Omega'$. The write clock phase adjustment module 56 generates a phase adjustment signal PHSADJ based on the write clock phase $\theta_D$ and the filtered phase error $\Omega'$. The write clock generation module 58 adjusts a phase of the write clock signal WRITE based on the phase adjustment signal PHSADJ.

In the following FIGS. 3 and 4, initial phase estimating systems are disclosed which may be used in replacement of the initial phase estimating system 50 of FIG. 2.

Figure 3:
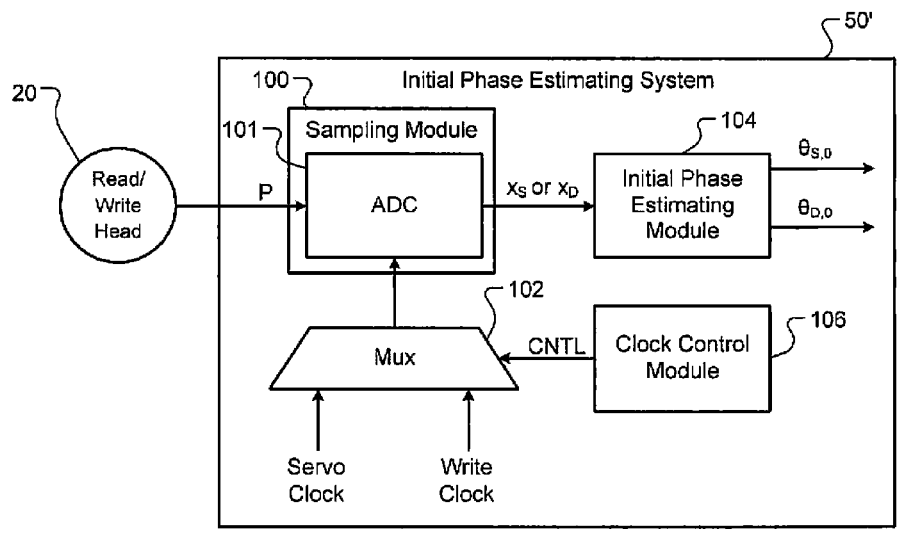
FIG. 3 is a functional block diagram of an initial phase estimating system incorporating a single analog-to-digital converter (ADC) in accordance with the present disclosure.

In FIG. 3, an initial phase estimating system 50' is shown and incorporates a sampling module 100 with a single analog-to-digital converter (ADC) 101. The initial phase estimating system 50' includes the ADC 101, a multiplexer 102, an initial phase estimating module 104 and a clock control module 106. When the read head is over the preamble portion of a servo wedge, the ADC 101 receives a preamble signal P from the head 20. The preamble signal P is an analog signal and is generated when reading a preamble of a servo sector. The ADC 101 samples and quantizes the preamble signal P to generate samples $x_S$ or samples $x_D$ based on which one of the servo clock signal SERVO and the write clock signal WRITE is used to drive the ADC 101. The sampling time is determined by the clock signal used to drive the ADC 101. As an example, samples may be generated upon detection of rising edges of the clock signals SERVO, WRITE.

The multiplexer 102 may be used to select one of the clock signals SERVO, WRITE based on a clock control signal CNTL from the clock control module 106. The control signal CNTL may be generated based on a predetermined period and/or length of the preamble. For example, the servo clock signal SERVO may be selected during a first portion and/or half of the preamble. The write clock signal WRITE may be selected during a second portion and/or half of the preamble. The initial phase estimating module 104 estimates the initial preamble phases $\theta_{S,0}$, $\theta_{D,0}$ based respectively on the samples $x_s$ or samples $x_D$.

Figure 4:
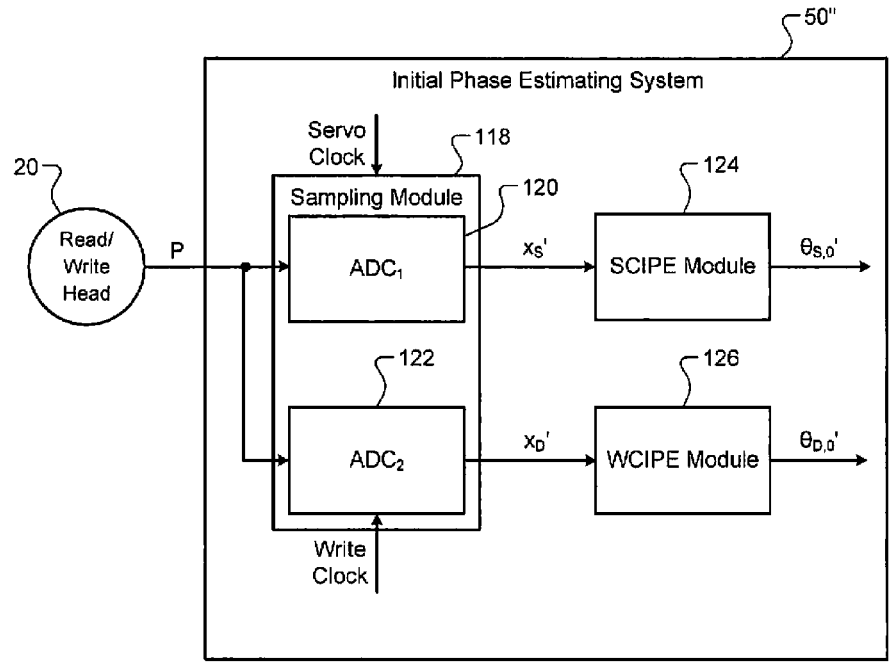
FIG. 4 is a functional block diagram of an initial phase estimating system incorporating two ADCs in accordance with the present disclosure.

In FIG. 4, an initial phase estimating system 50" is shown and incorporates a sampling module 118 with a first ADC 120 and a second ADC 122. The first ADC 120 samples the preamble signal P and generates servo-clock preamble samples $x_S'$. The second ADC 122 samples the preamble signal P and generates write-clock preamble samples $x_D'$. The initial phase estimating system 50" also includes a servo clock initial phase estimating (SCIPE) module 124 and a write clock initial phase estimating (WCIPE) module 126. The SCIPE module 124 estimates an initial servo phase $\theta_{S,0}'$ based on the servo-clock preamble samples $x_S'$. The WCIPE module 126 estimates an initial write phase $\theta_{D,0}'$ based on the write-clock preamble samples $x_D'$.

Figure 5:
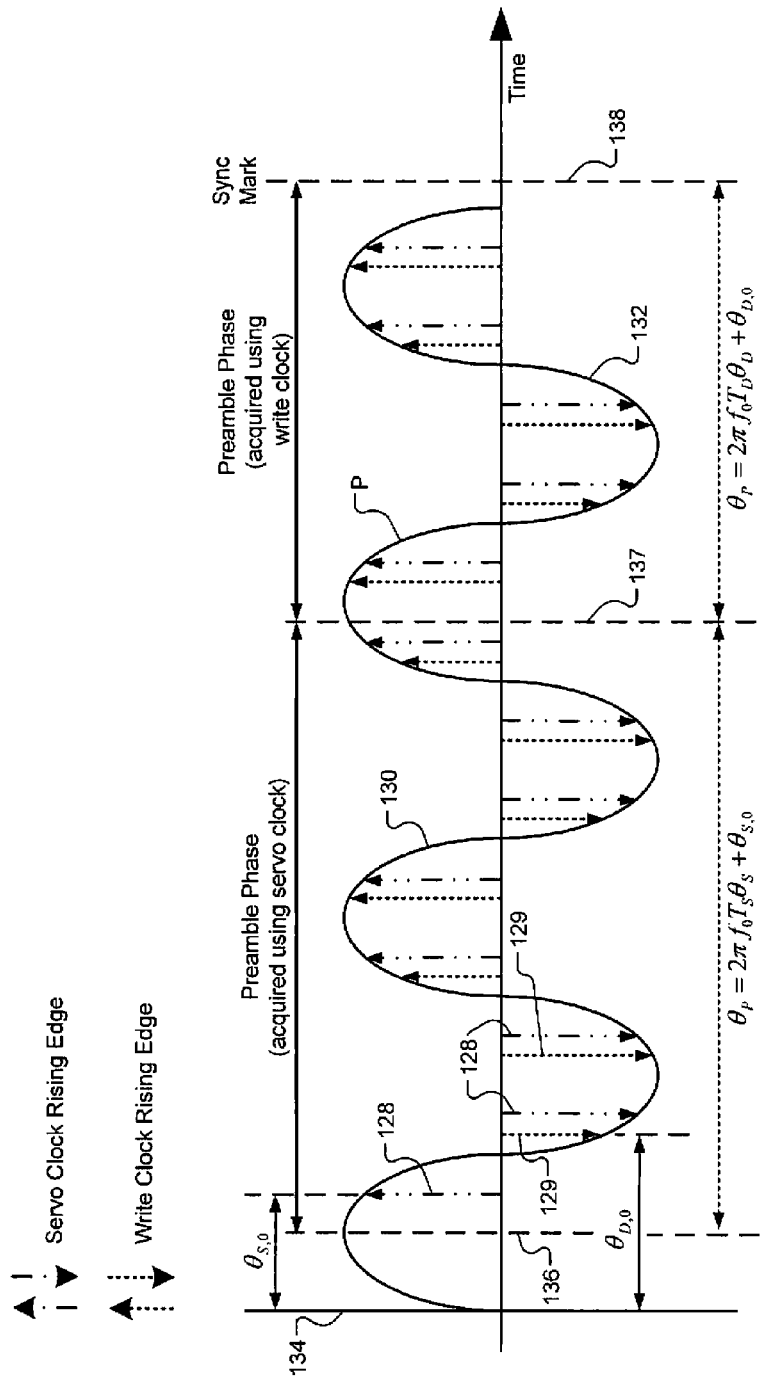
FIG. 5 is a plot of a preamble signal illustrating servo clock and write clock sampling in accordance with the present disclosure.

In FIG. 5, an example of a plot of the preamble signal P illustrating servo clock and write clock sampling is shown. A servo wedge (or section) may be read prior to writing data to a disk. The servo section may include a preamble, a sync mark and positioning information. The preamble may be read prior to detection of the sync mark and used to determine the preamble phases relative to the phase of a servo clock and a write clock. The preamble phases may then be used to determine and correct phase error of a write clock signal.

The preamble signal P may be a periodic analog signal with a repeating pattern. As an example, the preamble signal P may be a sine wave signal. One or more ADCs (e.g., ADCs 101, 120, 122 of FIGS. 3 and 4) may be driven based on servo and write clock signals to generate servo-clock preamble samples (shown by arrows 128) and write-clock preamble sample (shown by arrows 129). The servo-clock preamble samples may be generated, for example, based on rising edges of the servo clock signal. The write-clock preamble samples may be generated, for example, based on rising edges of the write clock signal.

Duration of the preamble signal P or a portion thereof may be divided into two portions 130, 132, as shown. The first portion 130 may be used to determine preamble phase based on the servo clock signal using, for example, equation 1, below where $f_0$ is frequency of the preamble signal, $T_S$ is period of the servo clock signal, $\theta_S$ is the number of servo clock cycles counted from the 1$^{st}$ servo-clock sampling point, and $\theta_{S,0}$ is an initial phase of the preamble signal at the 1$^{st}$ servo clock sampling point. The first portion 130 may begin at or subsequent to a preamble start time 134 (e.g., time 136). The first portion 130 may end when the second portion 132 begins at a transition time 137.

The second portion 132 may be used to determine preamble phase based on the write clock signal using, for example, equation 2, below where $T_D$ is period of the write clock signal, $\theta_D$ the number of servo clock cycles counted from the 1$^{st}$ write-clock sampling point, and $\theta_{D,0}$ is an initial phase of the preamble signal P at the 1$^{st}$ write clock sampling point. The duration of the preamble signal P may be divided, for example, when a single ADC is used, as in the implementation of FIG. 3.

$$\theta_P = 2\pi f_0 T_S \theta_S + \theta_{S,0} \quad (1)$$

$$\theta_P = 2\pi f_0 T_D \theta_D + \theta_{D,0} \quad (2)$$

As an alternative to dividing the duration of the preamble signal P, the preamble signal P may be sampled based on the servo clock signal while being sampled based on the write clock signal. The implementation of FIG. 4 may be used when the duration is not divided. Initial phases $\theta_{S,0}$, $\theta_{D,0}$ of the preamble signal P may be determined based on the samples $x_S$, $x_D$. The initial phases $\theta_{S,0}$, $\theta_{D,0}$ correspond respectively with ADC output signals, where the ADC output signals include the samples $x_S$, $x_D$. This is further described with respect to the methods of FIGS. 7A-8B below.

The sync mark may be read subsequent to reading the preamble signal, as shown by sync mark time 138. The sync mark provides a reference point on a disk from which writing of data in bit islands may be measured. For example, a distance (i.e. time) between the sync mark time 138 and a first bit island may be measured in write clock periods. The first bit island may be W write clock periods from the sync mark time 138. The sync mark time 138 may be used as described below to determine phase error of the write clock signal.

Figure 6:
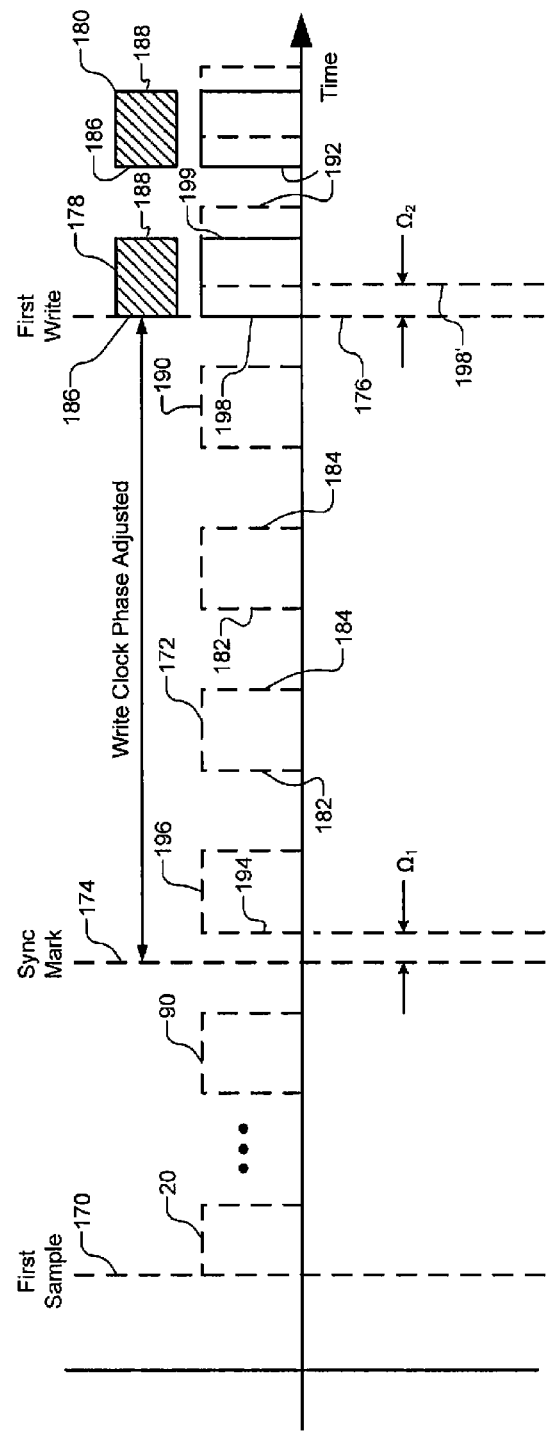
FIG. 6 is a plot of a write clock signals illustrating correction of write clock and bit island alignment in accordance with the present disclosure.

In FIG. 6, a plot of write clock signals illustrating correction of write clock and bit island alignment is shown. A first preamble sample time 170, a write clock signal 172, a sync mark time 174 and a first write time 176 are shown. The first preamble sample time 170 refers to time when a preamble signal is first sampled based on the write clock signal 172. The first write time 176 refers to a time when data is written in a first bit island 178 subsequent to detection of a sync mark. A second bit island 180 is shown that is written to subsequent to the first bit island 178.

The write clock signal 172 has a first phase prior to detection of the sync mark. A phase of the write clock signal may be adjusted between the sync mark time 174 and the first write time 176. The phase is adjusted to minimize and/or eliminate phase error 0 such that rising and falling edges 182, 184 of the write clock signal 172 are aligned respectively with starting and ending edges 186, 188 of discontinuous bit islands 178, 180. In FIG. 6, dashed lined write clock pulses 190 identifies the write clock signal 172 without phase error correction. Solid lined write clock pulses 199 identifies pulses generated subsequent to phase error correction.

The phase error may refer to: a difference in time between the expected write clock phase and the actual write clock at the sync mark time 174 (e.g., phase error $\Omega_1$); and/or a difference in time between the expected first write time 176 and an actual rising edge 198 of a first write clock pulse 199 subsequent to the first write time (e.g., phase error $\Omega_2$ is the difference between the expected first write time 176 and an non-corrected actual rising edge 198' prior to phase adjustment), as shown. The phase errors $\Omega_1$, $\Omega_2$ may be equal to each other if the phase error detected at the sync mark is 0, then the phase of the write clock signal 172 might not need to be adjusted. A phase error of 0 indicates that the write clock signal is synchronized with bit islands.

Figure 7A:
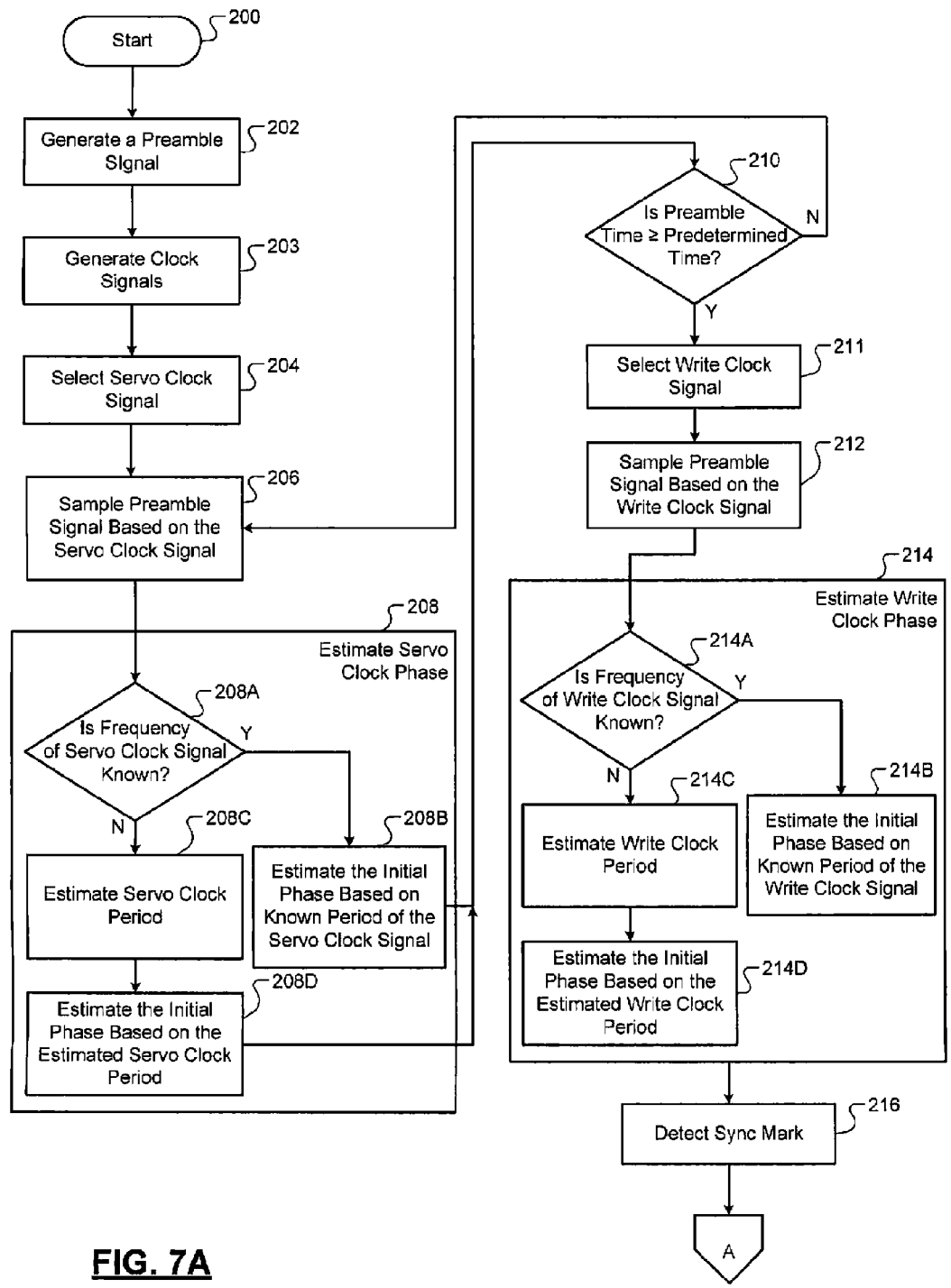
FIGS. 7A and 7B illustrate a method of synchronizing a write clock signal phase for bit-patterned recording system with a single ADC in accordance with the present disclosure.
Figure 7B:
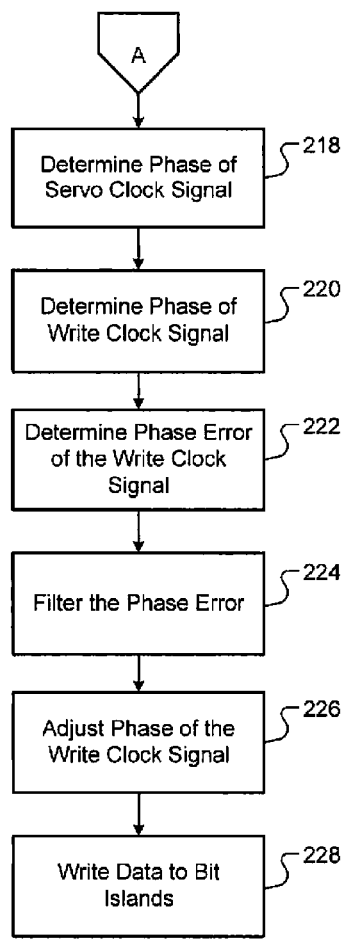

In FIGS. 7A and 7B, a method of synchronizing a write clock signal for an initial phase estimating system with a single ADC is shown. Although the following tasks 202-228 are primarily described with respect to the implementations of FIGS. 1-2, the tasks 202-228 may be easily modified to apply to other implementations of the present disclosure. The tasks 202-228 and/or a portion thereof may be iteratively performed. The method may begin at 200.

At 202, the servo is detected and the preamble is located. The read/write channel module 28 reads a servo wedge/section of a track of a disk to generate a preamble signal (e.g. the preamble signal P of FIG. 5). The preamble signal may be a sinusoidal signal or other pattern-repeating signal. The preamble signal may be represented by equation 3, below where $A_0$, is an unknown and/or detected amplitude of the preamble signal, $f_0$ is frequency of the preamble signal, t is time and $\theta^0$ is an unknown and/or detected phase of the preamble signal.

$$P = A_0 \sin(2\pi f_0 t + \theta_0) \tag{3}$$

The servo clock generation module 60 and the write clock generation module 58 generate respectively a servo clock signal and a write clock signal. At 204, the clock control module 106 generates the clock control signal CNTL to select a clock signal. At 206, the ADC 101 samples the preamble signal based on the servo clock signal to generate servo-clock preamble samples $x_S$. The servo-clock preamble samples $x_S$ may be represented by equation 4, below where $T_S$ is a period of the servo clock signal, $n_S$ is sample index S, $N_S$ is a number of acquired servo-clock preamble samples, and $\theta_{S,0}$ is a initial phase of the preamble signal at a first servo clock sample ($0 \leq \theta_{S,0} < 2\pi$).

$$x_S(n_S) = A_0 \sin(2\pi f^0 T_S n_S + \theta_{S,0}), n_S = 0, 1i, \ldots, N_S - 1 \tag{4}$$

At 208, the initial phase estimating module 104 estimates the servo clock initial phase $\theta_{S,0}$. At 208A, the initial phase estimating module 104 determines whether the frequency of the servo clock signal is known (e.g., stored frequency). Task 208B is performed when the frequency is known, otherwise task 208C is performed. At 208B, the initial phase estimating module 104 estimates the servo clock initial phase $\theta_{S,0}$. The servo clock initial phase $\theta_{S,O}$ is estimated, for example, using equation 5, below where $\hat{\theta}_{S,0}$ is an estimate of the servo clock initial phase $\theta_{S,0}$.

$$\hat{\theta}_{S,0} = \tan^{-1}\left[\frac{\sum_{n_s=0}^{N_S-1} x_S(n_S)\cos(2\pi f_0 T_S n_S)}{\sum_{n_s=0}^{N_S-1} x_S(n_S)\sin(2\pi f_0 T_S n_S)}\right] \tag{5}$$

At 208C, the initial phase estimating module 104 estimates a servo clock signal period $T_S$, where $\hat{T}_S$ is an estimate of the servo clock signal period $T_S$. The servo clock signal period $T_S$ may be estimated using, for example, equation 6 below.

$$\hat{T}_S = \frac{1}{f_0} \operatorname*{argmax}_{f} \left| \sum_{n_S=0}^{N_S-1} x_S(n_S) e^{-j2\pi f n_s} \right| \tag{6}$$

At 208D, the initial phase estimating module 104 estimates the servo clock initial phase $\theta_{S,0}$ using, for example, equation 7.

$$\hat{\theta}_{S,0} = \tan^{-1}\left[\frac{\sum_{n_s=0}^{N_S-1} x_S(n_S)\cos(2\pi f_0 \hat{T}_S n_S)}{\sum_{n_s=0}^{N_S-1} x_S(n_S)\sin(2\pi f_0 \hat{T}_S n_S)}\right] \tag{7}$$

At 210, the preamble time is compared with a predetermined time. The predetermined time determines the time that the preamble signal is sampled using the servo clock. Task 211 is performed when the preamble time is greater than or equal to the predetermined time, otherwise task 206 is performed, i.e., switching to use the write clock to sample the preamble signal.

At 211, the clock control module generates the control signal CNTL to select the write clock signal rather than the servo clock signal. At 212, the ADC 101 is driven by the write clock signal instead of by the servo clock signal. The ADC samples are acquired from the remaining portion of the preamble signal based on the write clock signal. The write samples $x_D$ may be represented by equation 8, below where $T_D$ is a period of the write clock signal, $n_D$ is sample index $K_D$ is a number of write clock rising edges between the first servo clock sample and the first write clock sample, $N_D$ is a number of acquired write samples, and $\theta^{D,0}$ is a second initial phase of the preamble signal at a first write clock rising edge subsequent to the first servo clock sample ($0 \leq \theta_{D,0} - \theta_{S,0} < 2\pi$).

$$x_D(n_D) = A_0 \sin(2\pi f_0 T_D(n_D + K_D) + \theta_{D,0}), n_D = 0, 1, \ldots, N_D - 1 \tag{8}$$

At 214, the phase estimating module 104 estimates the write clock initial phase $\theta_{D,0}$. At 214A, the initial phase estimating module 104 determines whether the frequency of the write clock signal is known. Task 214B is performed when the frequency is known, otherwise task 214C is performed. At 214B, the initial phase estimating module 104 estimates the write clock initial phase $\theta^{D,0}$. The write clock initial phase $\theta_{D,0}$ may be estimated, for example, using equation 9, below where $\hat{\theta}_{D,0}$ is an estimate of the write clock initial phase $\theta_{D,O}$.

$$\hat{\theta}_{D,0} = \tan^{-1}\left[\frac{\sum_{n_D=0}^{N_D-1} x_D(n_D)\cos(2\pi f_0 T_D(n_D + K_D))}{\sum_{n_D=0}^{N_D-1} x_D(n_D)\sin(2\pi f_0 T_D(n_D + K_D))}\right] \tag{9}$$

At 214C, the initial phase estimating module 104 estimates a write clock signal period $T_D$. The write clock signal period $T_D$ is estimated using, for example, equation 10, below where $\hat{T}_D$ is an estimate of the write clock signal period $T_D$.

$$\hat{T}_D = \frac{1}{f_0} \underset{f}{\operatorname{argmax}} \left| \sum_{n_D=0}^{N_D-1} x_D(n_D) e^{-j2\pi f n_D} \right| \quad (10)$$

At 214D, the initial phase estimating module 104 estimates the first initial phase $\theta_{D,0}$. The write clock initial phase $\theta_{D,0}$ may be estimated using, for example, equation 11 below.

$$\hat{\theta}_{D,0} = \tan^{-1} \left[ \frac{\sum_{n_D=0}^{N_D-1} x_D(n_D) \cos(2\pi f_0 \hat{T}_D(n_D + K_D))}{\sum_{n_D=0}^{N_D-1} x_D(n_D) \sin(2\pi f_0 \hat{T}_D(n_D + K_D))} \right] \quad (11)$$

At 216, the sync mark detection module 62 detects a sync mark, as described above. Task 216 may be performed prior to, while and/or subsequent to estimating the initial phases $\theta_{S,0}$, $\theta_{D,0}$.

At 218, phase $\theta_S$ of the servo clock signal at the sync-mark is determined. The phase $\theta_S$ may be determined at or subsequent to the sync mark. The phase $\theta_S$ may refer to a number of servo clock periods between the first servo clock sampling time (point) and the sync mark. The phase $\theta_S$ may be determined based on equation 12. The phase of the preamble signal at the sync mark is provided in equation 12 below.

$$\theta_P = 2\pi f_0 T_S \theta_S + \hat{\theta}_{S,0} \quad (12)$$

The phase $\theta_S$ may be identified with a resolution of several fractional bits or a number Y of servo clock periods, where Y is a real number. Y may be a fractional or non-integer number.

At 220, phase $\theta_D$ of the write clock signal at the sync-mark is determined. The phase $\theta_D$ may be determined at or subsequent to the sync mark. The phase $\theta_D$ may refer to a number of write clock periods between the first write clock rising edge (subsequent to the first servo clock sample) and the sync mark. The phase may be determined based on equations 13 and/or 14 below.

$$\theta_P = 2\pi f_0 T_D \theta_D + \hat{\theta}_{D,0} \quad (13)$$

$$\theta_D = \frac{T_S}{T_D} \theta_S + \frac{1}{2\pi f_0 T_D} (\hat{\theta}_{S,0} - \hat{\theta}_{D,0}) \quad (14)$$

At 222, the write clock phase error module 54 determines phase error $\Omega$ based on the phase $\theta_D$ of the write clock signal, the time of the sync mark, and/or a first write time of a first bit island (or first bit island signal ISL1).

At 224, the loop filter 66 may filter the phase error $\Omega$ to generate a filtered phase error $\Omega'$. At 226, the write check phase adjustment module 56 generates the phase adjustment signal PHSADJ based on the filtered phase error $\Omega'$. The phase is adjusted to reduce the phase error $\Omega$ to 0, which aligns the rising and falling edges of the write clock signal with starting and ending edges of bit islands.

At 228, the read/write channel module 28 may write to the bit islands of the disk based on the phase adjusted write clock signal. The method may end at 230.

Figure 8A:
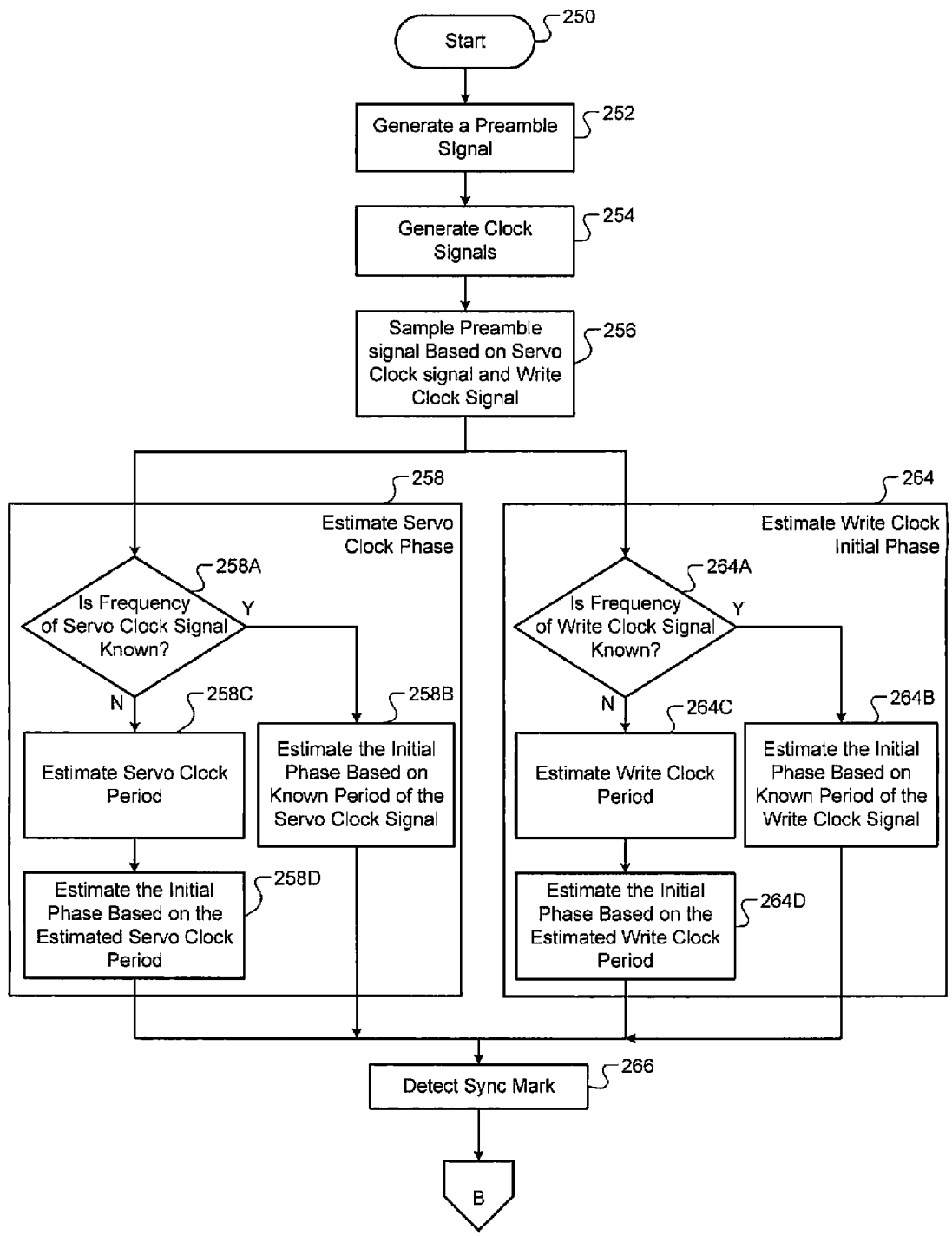
FIGS. 8A and 8B illustrate a method of synchronizing a write clock signal phase for bit-patterned recording system with two ADCs in accordance with the present disclosure.
Figure 8B:
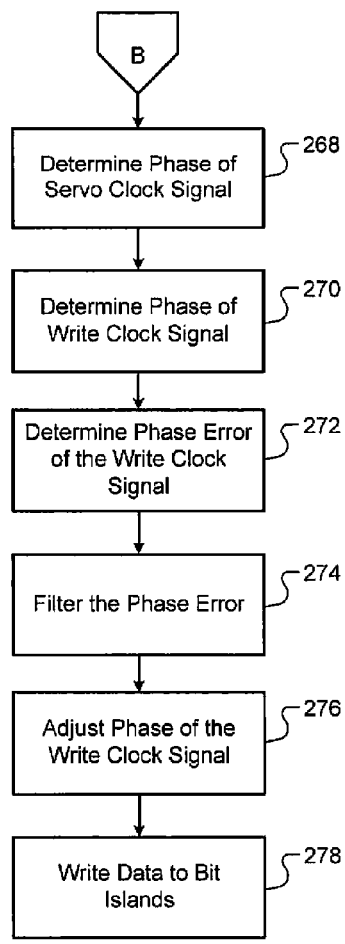

In FIGS. 8A and 8B, a method of synchronizing a write clock signal for an initial phase estimating system with two ADCs is shown. Although the following tasks 252-278 are primarily described with respect to the implementations of FIGS. 1 and 3, the tasks 252-258 may be easily modified to apply to other implementations of the present disclosure. The tasks 252-258 and/or a portion thereof may be iteratively performed. The method may begin at 250.

At 252, the servo is detected and the preamble is located. The read/write channel module 28 reads a servo wedge (or section) of a disk to generate a preamble signal (e.g. the preamble signal P of FIG. 5). The preamble signal may be a sinusoidal signal or other pattern repeating signal. The preamble signal may be represented by equation 3.

The servo clock generation module 60 and the write clock generation module generate respectively a servo clock signal and a write clock signal. At 256, the ADCs 120 and 122 sample the preamble signal based on the servo clock signal to generate servo-clock preamble samples $x_S$ and based on the write clock signal to generate write-clock preamble samples $x_D$. The servo samples $x_S$ may be represented by equation 4. The write samples $x_D$ may be represented by equation 8.

At 258, the initial phase estimating module 104 estimates the servo clock initial phase $\theta_{S,0}$. At 258A, the initial phase estimating module 104 determines whether the frequency of the servo clock signal is known. Task 258B is performed when the frequency is known, otherwise task 258C is performed. At 258B, the initial phase estimating module 104 estimates the servo clock initial phase $\theta_{S,0}$ using, for example, equation 5. At 258C, the initial phase estimating module 104 estimates a servo clock signal period $T_S$. The servo clock signal period $T_S$ may be estimated using, for example, equation 6. At 258D, the initial phase estimating module 104 estimates the servo clock initial phase $\theta_{S,0}$ using, for example, equation 7.

At 264, the phase estimating module 104 estimates the write clock initial phase $\theta^{D,0}$. At 264A, the initial phase estimating module 104 determines whether the frequency of the write clock signal is known. Task 264B is performed when the frequency is known, otherwise task 264C is performed. At 264B, the initial phase estimating module 104 estimates the write clock initial phase $\theta^{D,0}$. The write clock initial phase $\theta_{D,0}$ may be estimated, for example, using equation 9. At 264C, the initial phase estimating module 104 estimates a write clock signal period $T_D$. The write clock signal period $T_D$ is estimated using, for example, equation 10. At 264D, the initial phase estimating module 104 estimates the write clock initial phase $\theta_{D,0}$. The write clock initial phase $\theta_{D,0}$ may be estimated using, for example, equation 11. Task 258 may be performed prior to, while and/or subsequent to task 264.

At 266, the sync mark detection module 62 detects a sync mark. Task 266 may be performed prior to, while and/or subsequent to estimating the initial phases $\theta_{S,0}$, $\theta^{D,0}$.

At 268, phase $\theta_S$ of the servo clock signal is determined. The phase $\theta_S$ may be determined at or subsequent to the sync mark. The phase $\theta_S$ may refer to a number of servo clock periods between the first servo clock sampling time (point) and the sync mark. The phase $\theta_S$ may be determined based on equation 12. The phase of the preamble signal at the sync mark is provided in equation 12. The phase $\theta_S$ may be identified with a resolution of several fractional bits or a number Y of servo clock periods, where Y is a real number. Y may be a fractional or non-integer number.

At 270, phase $\theta_D$ of the write clock signal is determined. The phase $\theta_D$ may be determined at or subsequent to the sync mark. The phase $\theta_D$ may refer to a number of write clock periods between the first write clock rising edge (subsequent to the first servo clock sample) and the sync mark. The phase may be determined based on equations 13 and/or 14.

At 272, the write clock phase error module 54 determines phase error Ω based on the phase $\theta_D$ of the write clock signal, the time of the sync mark, and/or a first write time of a first bit island.

At 274, the loop filter 66 may filter the phase error Ω to generate a filtered phase error Ω'. At 276, the write check phase adjustment module 56 generates the phase adjustment signal PHSADJ based on the filtered phase error Ω'. The phase is adjusted to reduce the phase error Ω to 0, which aligns the rising and falling edges of the write clock signal with starting and ending edges of bit islands.

At 278, the read/write channel module 28 may write to the bit islands of the disk based on the phase adjusted write clock signal. The method may end at 280.

The above-described tasks of FIGS. 7A-8B are meant to be illustrative examples; the tasks may be performed sequentially, synchronously, simultaneously, continuously, during overlapping time periods or in a different order depending upon the application.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A system comprising:
a storage device comprising (i) servo sectors, and (ii) discontinuous media with bit islands;
a channel module configured to read the servo sectors based on a servo clock to generate an analog signal;
a sampling module configured to sample the analog signal (i) based on a servo clock signal to generate first samples, and (ii) based on a write clock signal to generate second samples;
a first phase module configured to estimate a phase of the write clock signal based on (i) the first samples, and (ii) the second samples; and
an adjustment module configured to adjust the phase of the write clock signal based on the estimated phase of the write clock signal,
wherein the channel module is configured to, based on the write clock signal with the adjusted phase, write data to the bit islands of the discontinuous media.

2. The system of claim 1, further comprising an error module configured to estimate a phase error of the write clock signal based on the estimated phase of the write clock signal,
wherein the adjustment module is configured to adjust the phase of the write clock signal based on the phase error.

3. The system of claim 2, wherein the error module is configured to determine the phase error of the write clock signal based on (i) a time of a synchronization mark on the discontinuous media, or (ii) a time of a starting edge of one of the bit islands, wherein the data is written to the one of the bit islands subsequent to the synchronization mark.

4. The system of claim 3, wherein the error module is configured to determine the phase error of the write clock signal based on a difference between (i) the time of the synchronization mark, and (ii) a time of a first rising edge of the write clock signal occurring subsequent to the synchronization mark.

5. The system of claim 3, wherein the error module is configured to determine the phase error of the write clock signal based on a difference between (i) the time of the starting edge of the one of the bit islands, and (ii) a time of a first rising edge of the write clock signal occurring subsequent to the time of the starting edge of the one of the bit islands.

6. The system of claim 1, further comprising a multiplexer configured to select one of the servo clock signal and the write clock signal, wherein:
the sampling module comprises an analog-to-digital converter; and
the analog-to-digital converter is configured to, based on an output of the multiplexer, sample the analog signal to generate the first samples or the second samples.

7. The system of claim 6, further comprising a clock control module configured to control the multiplexer to select (i) the servo clock signal during a first portion of the analog signal, and (ii) the write clock signal during a second portion of the analog signal,
wherein the analog-to-digital converter is configured to sample (i) the first portion of the analog signal based on the servo clock signal, and (ii) the second portion of the analog based on the write clock signal.

8. The system of claim 1, wherein the sampling module comprises:
a first analog-to-digital converter configured to sample the analog signal based on the servo clock signal to generate the first samples; and
a second analog-to-digital converter configured to sample the analog signal based on the write clock signal to generate the second samples.

9. The system of claim 8, further comprising:
a second phase module configured to estimate a phase of the analog signal based on the first samples; and
a third phase module configured to estimate a phase of the analog signal based on the second samples,
wherein the first phase module is configured to estimate the phase of the write clock signal based on (i) the phase of the analog signal estimated using the first samples, and (ii) the phase of the analog signal estimated using the second samples.

10. The system of claim 1, wherein the channel module is configured to, based on the write clock signal with the adjusted phase, synchronize bit positions of the data on the bit islands of the discontinuous media.

11. The system of claim 1, wherein the first phase module is configured to:
estimate first periods of the servo clock signal;
estimate second periods of the write clock signal;
based on the first periods and the second periods, estimate the phase of the analog signal; and
estimate the phase of the write clock signal based on the phase of the analog signal.

12. The system of claim 1, wherein the first phase module is configured to:
estimate a phase of the analog signal based on the first samples;
estimate a phase of the analog signal based on the second samples; and
estimate the phase of the write clock signal based on a difference between (i) the phase of the analog signal estimated using the first samples, and (ii) the phase of the analog signal estimated using the second samples.

13. The system of claim 12, wherein the first phase module is configured to estimate the phase of the write clock signal based on (i) a period of the servo clock signal, (ii) a period of the write clock signal, and (iii) a phase of the servo clock signal.

14. A method comprising:
reading the servo sectors of a storage device based on a servo clock to generate an analog signal, wherein the storage device includes discontinuous media with bit islands;

sampling the analog signal (i) based on a servo clock signal to generate first samples, and (ii) based on a write clock signal to generate second samples;

estimating a phase of the write clock signal based on (i) the first samples, and (ii) the second samples;

adjusting the phase of the write clock signal based on the estimated phase of the write clock signal; and based on the write clock signal with the adjusted phase, writing data to the bit islands of the discontinuous media.

15. The method of claim 14, further comprising:

estimating a phase error of the write clock signal based on the estimated phase of the write clock signal; and adjusting the phase of the write clock signal based on the phase error.

16. The method of claim 15, further comprising determine the phase error of the write clock signal based on (i) a time of a synchronization mark on the discontinuous media, or (ii) a time of a starting edge of one of the bit islands, wherein the data is written to the one of the bit islands subsequent to the synchronization mark.

17. The method of claim 14, further comprising:

selecting one of the servo clock signal and the write clock signal; and based on the selected one of the servo clock signal and the write clock signal, sample the analog signal to generate the first samples or the second samples.

18. The method of claim 17, further comprising:

selecting (i) the servo clock signal during a first portion of the analog signal, and (ii) the write clock signal during a second portion of the analog signal; and sampling (i) the first portion of the analog signal based on the servo clock signal, and (ii) the second portion of the analog based on the write clock signal.

19. The method of claim 14, further comprising:

estimating a phase of the analog signal based on the first samples;

estimating a phase of the analog signal based on the second samples; and estimating the phase of the write clock signal based on (i) the phase of the analog signal estimated using the first samples, and (ii) the phase of the analog signal estimated using the second samples.

20. The method of claim 14, further comprising based on the write clock signal with the adjusted phase, synchronizing bit positions of the data on the bit islands of the discontinuous media.

\* \* \* \* \*